(12) United States Patent
Ulinskas

(10) Patent No.: US 10,531,500 B2
(45) Date of Patent: Jan. 7, 2020

(54) SELF-CONFIGURING BACKBONE FOR MOBILE AD-HOC NETWORKS (MANETS)

(71) Applicant: Raytheon Company, Waltham, MA (US)

(72) Inventor: Tyler J. Ulinskas, San Diego, CA (US)

(73) Assignee: Raytheon Company, Waltham, MA (US)

( * ) Notice: Subject to any disclaimer, the term of this patent is extended or adjusted under 35 U.S.C. 154(b) by 135 days.

(21) Appl. No.: 15/171,406

(22) Filed: Jun. 2, 2016

(65) Prior Publication Data

US 2017/0353978 A1 Dec. 7, 2017

(51) Int. Cl.
| | |
|---|---|
| *H04W 76/10* | (2018.01) |
| *H04L 29/08* | (2006.01) |
| *H04W 84/18* | (2009.01) |
| *H04W 40/24* | (2009.01) |

(52) U.S. Cl.
CPC ............. *H04W 76/10* (2018.02); *H04L 67/12* (2013.01); *H04W 40/24* (2013.01); *H04W 84/18* (2013.01)

(58) Field of Classification Search
CPC ..... H04W 76/02; H04W 84/18; H04W 76/10; H04W 88/14; H04W 40/24; H04W 76/34; H04W 76/36; H04W 84/14; H04L 67/12
USPC ......................................................... 370/254
See application file for complete search history.

(56) References Cited

U.S. PATENT DOCUMENTS

| | | | |
|---|---|---|---|
| 4,041,389 A | 8/1977 | Oades | |
| 8,000,267 B2 * | 8/2011 | Solis | H04L 45/54 |
| | | | 370/256 |
| 8,125,964 B2 | 2/2012 | Ling et al. | |
| 8,218,522 B2 | 7/2012 | Sy et al. | |
| 8,982,708 B1 * | 3/2015 | McCabe | H04L 45/28 |
| | | | 370/216 |
| 2003/0153338 A1 * | 8/2003 | Herz | H04L 45/124 |
| | | | 455/517 |
| 2004/0082341 A1 * | 4/2004 | Stanforth | G01C 21/206 |
| | | | 455/456.1 |

(Continued)

FOREIGN PATENT DOCUMENTS

| | | | |
|---|---|---|---|
| CN | 101110732 B | * | 5/2011 |
| EP | 1 958 469 B1 | | 8/2008 |

(Continued)

OTHER PUBLICATIONS

Bao et al., "A New Approach to Channel Access Scheduling for Ad Hoc Networks", Jul. 2001, ACM, SIGMOBILE Jul. 2001 Rome Italy, pp. 210-221.*

(Continued)

*Primary Examiner* — Oussama Roudani
*Assistant Examiner* — Shah M Rahman
(74) *Attorney, Agent, or Firm* — Daly Crowley Mofford & Durkee

(57) ABSTRACT

Described embodiments provide systems, methods and apparatus for operating a mobile ad-hoc network (MANET). The MANET includes a plurality of nodes that are identified as stationary nodes or mobile nodes. One or more of the identified stationary nodes are set as backbone nodes. A backbone network is formed by the one or more backbone nodes and an alias is determined for each backbone node. Channel access is allocated to each backbone node based upon the determined alias for the one or more backbone nodes.

25 Claims, 15 Drawing Sheets

(56) References Cited

U.S. PATENT DOCUMENTS

| | | | |
|---|---|---|---|
| 2005/0054346 A1* | 3/2005 | Windham | H04L 45/00 455/445 |
| 2005/0254471 A1 | 11/2005 | Zhang et al. | |
| 2007/0115895 A1* | 5/2007 | Ling | G01S 5/0289 370/338 |
| 2008/0285520 A1* | 11/2008 | Forte | H04W 36/0011 370/331 |
| 2010/0232317 A1* | 9/2010 | Jing | H04L 12/2807 370/254 |
| 2011/0164527 A1* | 7/2011 | Mishra | H04L 45/123 370/252 |
| 2011/0235516 A1 | 9/2011 | Roy et al. | |
| 2013/0100942 A1* | 4/2013 | Rudnick | H04B 7/2656 370/337 |
| 2013/0188513 A1* | 7/2013 | Vasseur | H04W 40/248 370/254 |
| 2014/0323134 A1 | 10/2014 | Choi et al. | |
| 2015/0172953 A1* | 6/2015 | Firoiu | H04L 41/12 370/236 |
| 2015/0208316 A1* | 7/2015 | Mosko | H04W 40/02 370/238 |
| 2017/0284839 A1* | 10/2017 | Ojala | H04L 67/12 |

FOREIGN PATENT DOCUMENTS

| | | |
|---|---|---|
| WO | WO 2002003091 A2 | 1/2002 |
| WO | WO 2003098815 A2 | 11/2003 |
| WO | WO 2008005994 A1 | 1/2008 |
| WO | WO 2008048292 A2 | 4/2008 |

OTHER PUBLICATIONS

Ramanathan, S., "A unified framework and algorithm for channel assignment in wireless networks", 1999, Wireless Networks, vol. 5 pp. 81-94 (Year: 1999).*

Hammond et al. "Properties of a Transmission Assignment Algorithm for Multiple-Hop Packet Radio Networks", Jul. 2004, IEEE Transactions on Wireless Communications, vol. 3, No. 4, pp. 1048-1052 (Year: 1004).*

PCT International Search Report and Written Opinion dated Jul. 17, 2017 for International Application No. PCT/US2017/026741; 16 Pages.

Hazarika; "A Load-Based Approach to Forming a Connected Dominating Set for an Ad Hoc Network;" Clemson University; Aug. 31, 2014; 52 Pages.

Li et al., "Constructing Virtual Backbone with Bounded Diameters in Cognitive Radio Networks;" Springer International Publishing Switzerland; Aug. 1, 2015; 11 Pages.

Misra et al., "Guide to Wireless Mech Networks, Chapter 1.10;" Springer Verlag; Dec. 31, 2009; 1 Page.

Sridhar K N et al. "Stability and Hop-Count based Approach for Route Computation in MANET"; School of Computing, National University of Singapore, IEEE 2005, pp. 25-31 (7 pages).

Raw et al. "Throughput and Delay Analysis of Next-Hop Forwarding Method for Non-Linear Vehicular AD HOC Networks"; International Journal of AdHoc Networking Systems (IJANS) vol. 2, No. 2, Apr. 2012, pp. 33-44 (12 pages).

Bao et al. "Distributed Channel Access Scheduling for Ad Hoc Networks"; School of Information and Computer Sciences, University of California, pp. 1-31 (31 pages).

Bao et al. "Distributed Transmission Scheduling Using Code-Division Channelization"; School of Engineering, University of California, 2002; pp. 154-166 (12 pages).

Bao et al. "A New Approach to Channel Access Scheduling for AdHoc Networks"; University of California; *Processing of the 7th Annual International Conference on Mobile Computing and Networking*, MobiCom '01; New York, NY 2001, pp. 210-221 (11 pages).

Haenggi et al. "Routing in Ad Hoc Networks: A Case for Long Hops"; IEEE Communications Magazine, Oct. 2005, pp. 93-101 (9 pages).

Conti et al. "Mobile Ad hoc Networking :Milestones, Challenges, and New Research Directions"; IEEE Communications Magazine, Jan. 2014, pp. 85-96 (12 pages).

Yang et al. "Node Activation with Polling Channel Access"; 2004 IEEE International Conference on Communications, vol. 7, Jun. 2004, pp. 4352-4356 (6 pages).

International Preliminary Report on Patentability dated Dec. 13, 2018 for International Application No. PCT/US2017/026741; 9 Pages.

* cited by examiner

100

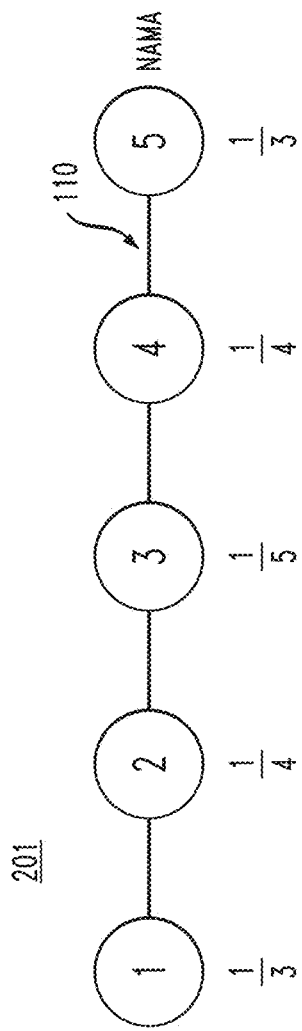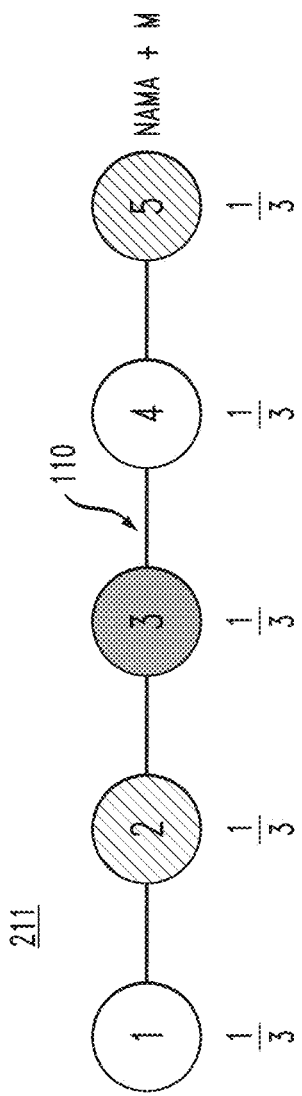

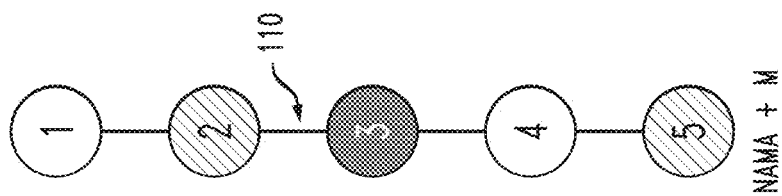

| NODE ID = 1 | ORIGINATOR = TBD | ORIGINATION TIME = TBD |
|---|---|---|
| COUNTDOWN = 3 | CONTENTION NEIGHBORHOOD = {2, 3} | |

| NODE ID | DISTANCE, D | ALIAS, A | M COUNTER | COORDINATION NEIGHBORHOOD |
|---|---|---|---|---|
| 1 | TBD | TBD | N/A | {2} |
| 2 | TBD | TBD | 0 | {1, 3} |
| ... | ... | ... | ... | ... |
| j | N/A | N/A | N/A | N/A |

| NODE ID = 1 (1302) | ORIGINATOR = TBD (1304) | ORIGINATION TIME = TBD (1306) |
|---|---|---|
| COORDINATION NEIGHBORHOOD = {2} (1308) | | |
| NODE ID (1322) | DISTANCE, D (1324) | ALIAS, A (1326) |
| 1 | TBD | TBD |
| 2 | TBD | TBD |

(1320)

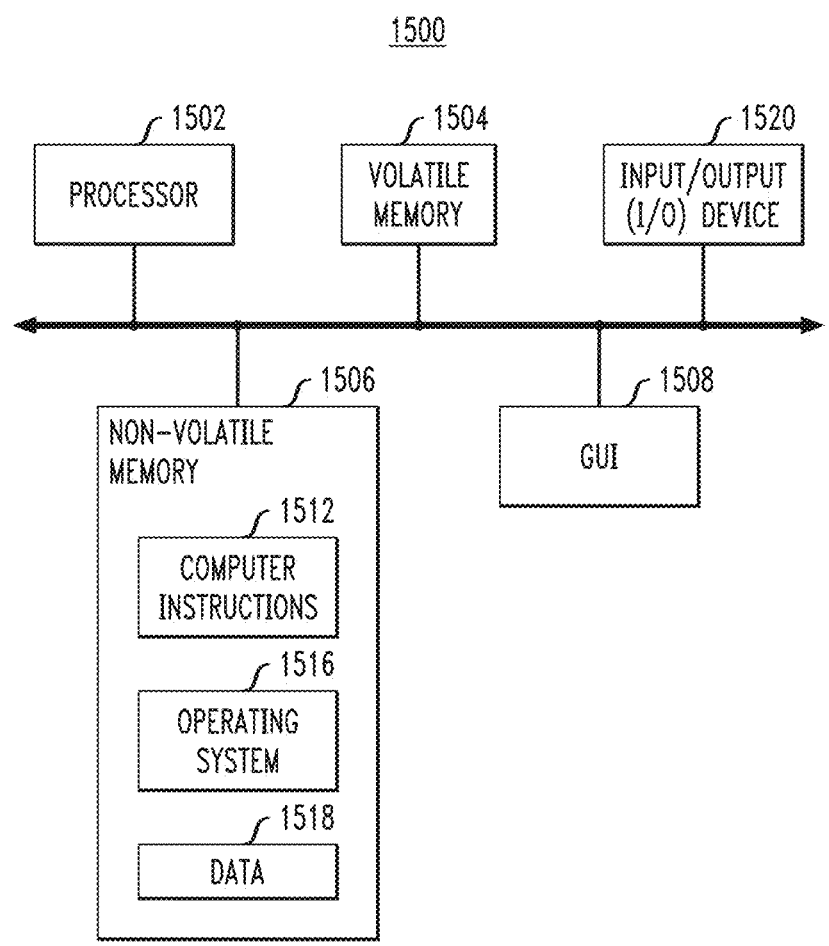

SELF-CONFIGURING BACKBONE FOR MOBILE AD-HOC NETWORKS (MANETS)

BACKGROUND

Mobile ad-hoc networks (MANETs) facilitate communication among mobile network nodes, for example mobile nodes installed in vehicles, aircraft, and the like. However, due to node mobility and a lack of a fixed network infrastructure, MANETs experience dynamically changing network topology that makes maintaining end-to-end connectivity difficult. Further, MANETs may commonly deliver lower throughput and experience higher delays than fixed networks. Finally, known MANET access scheduling techniques can be inefficient (e.g., create bottleneck nodes).

SUMMARY

This Summary is provided to introduce a selection of concepts in a simplified form that are further described below in the Detailed Description. This Summary is not intended to identify key or essential features or combinations of the claimed subject matter, nor is it intended to be used to limit the scope of the claimed subject matter.

In one aspect, a method of operating a mobile ad-hoc network (MANET) is provided. The MANET includes a plurality of nodes that are identified as stationary nodes or mobile nodes. One or more of the identified stationary nodes are set as backbone nodes. A backbone network is formed by the one or more backbone nodes and an alias is determined for each backbone node. Channel access is allocated to each backbone node based upon the determined alias for the one or more backbone nodes.

In another aspect, an apparatus for use in a mobile ad-hoc network (MANET) is provided. The apparatus includes a transceiver for transmitting and receiving signals between the apparatus and a plurality of nodes of the MANET and a processor. The processor sets an identifier to identify the apparatus as either a backbone node or a mobile node. An alias is determined for at least one of: the apparatus, and one or more nodes in communication with the apparatus. If the apparatus is identified as a backbone node, at least a portion of a backbone link is formed with one or more other backbone nodes. Channel access is allocated to the backbone node based upon the determined alias for the backbone node.

In another aspect, a mobile ad-hoc network (MANET) system is provided. The MANET system includes a plurality of nodes. Each node includes a transceiver for transmitting and receiving signals between the apparatus and a plurality of nodes of the MANET and a processor. The processor sets an identifier to identify the apparatus as either a backbone node or a mobile node. An alias is determined for at least one of: the apparatus, and one or more nodes in communication with the apparatus. If the apparatus is identified as a backbone node, at least a portion of a backbone link is formed with one or more other backbone nodes. Channel access is allocated to the backbone node based upon the determined alias for the backbone node.

BRIEF DESCRIPTION OF THE DRAWING FIGURES

Other aspects, features, and advantages of the described embodiments will become more fully apparent from the following detailed description, the appended claims, and the accompanying drawings in which like reference numerals identify similar or identical elements. Reference numerals that are introduced in the specification in association with a drawing figure might be repeated in one or more subsequent figures without additional description in the specification in order to provide context for other features.

FIGS. 2A and 2B are diagrams showing illustrative activation probabilities of nodes of the MANET of FIG. 1 in accordance with described embodiments;

FIGS. 3A and 3B are diagrams showing illustrative network alias assignments and connectivities for an illustrative MANET in accordance with described embodiments;

FIG. 12 is a block diagram showing illustrative data employed by nodes of the MANET of FIG. 1 in accordance with described embodiments;

FIG. 13 is a block diagram showing illustrative data sent by a node to one or more neighboring nodes of the MANET of FIG. 1 in accordance with described embodiments;

FIG. 15 is a block diagram showing a hardware architecture of an illustrative node of the MANET of FIG. 1.

DETAILED DESCRIPTION

Pure MANET systems do not employ any fixed network infrastructure or a central system for organizing and managing the network. For example, a pure MANET does not employ a back-haul network, in contrast to a cellular telephone network. Flexibility of network infrastructure, organization and management, are typically obtained at the expense of some performance over static (or fixed) networks. For example, network management processes that accommodate fully mobile nodes may deliver lower throughput and accumulate more delay than network management processes that can exploit knowledge of a static network.

In practice, not every operation is best served by a pure MANET solution. Although many temporary or tactical deployments (e.g., of military personnel, emergency responders, etc.) may benefit from pure MANET systems, in some deployments stationing nodes at key locations may increase efficiency. Thus, described embodiments provide a multi-paradigm solution that provides performance benefits of a static back-haul network without requiring permanent network infrastructure and still supporting the flexibility of network infrastructure, organization and management of a pure MANET system.

As described herein, illustrative embodiments provide systems, methods and apparatus for operating a mobile ad-hoc network (MANET). The MANET is a set of nodes that dynamically discover one another, establish communication links and act as routers for one another in a way that constantly adapts to the changing connectivity induced by the mobility of some or all of the nodes. For example, each node may operate in accordance with MANET protocols to establish and maintain a MANET. Given ones of the set of nodes are identified as stationary nodes or mobile nodes and one or more of the identified stationary nodes may be set as backbone nodes. A backbone network is formed by the one or more backbone nodes and an alias is determined for each backbone node. Channel access is allocated to each backbone node based upon the determined alias for the one or more backbone nodes.

Figure 1:
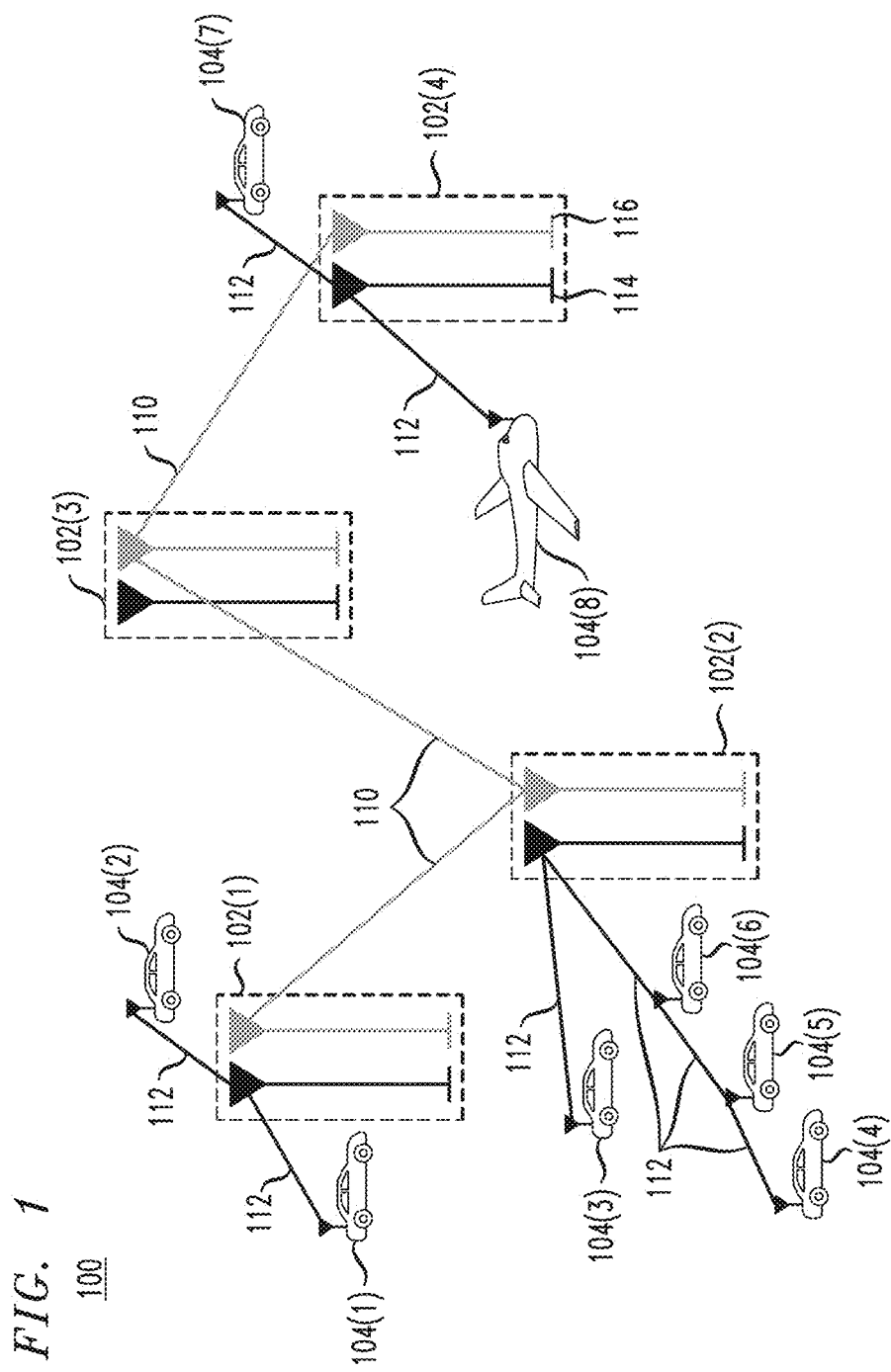
FIG. 1 is a block diagram of an illustrative mobile ad-hoc network (MANET) in accordance with described embodiments.

Referring to FIG. 1, a block diagram of illustrative MANET 100 is shown. As shown, MANET 100 may include one or more wireless communication nodes. Nodes may be mounted to a vehicle, aircraft or watercraft, may be carried by a person, or may be otherwise portable. For example, a radio mounted to an automobile is an example of a node. In general nodes may be defined as mobile nodes or stationary nodes. A given node may be mobile at some times and stationary at other times, for example, an automobile that pauses at a location may be considered stationary until it starts moving again.

As used herein, a stationary node, or station, is a node that is set to be stationary (e.g., static) for a given period of time. Thus, as shown in FIG. 1, MANET 100 may include one or more mobile nodes 104 and one or more stationary nodes, or stations, 102. In some embodiments, mobile nodes 104 and stations 102 may both be portable radios, but stations 102 have been set to be stationary (or static) for a given time. For example, as will be described, stations 102 may be deployed to form a temporary backbone network 110 of MANET 100 to, at least temporarily, facilitate wireless communications in an area of interest (e.g., to support a deployment of soldiers, emergency responders, etc., who may only be in the area for a temporary period of time). Backbone 110 may provide more efficient communication for a set of stations 102 whose location (e.g., connectivity) will not change over a timeline of interest (e.g., a duration of a deployment).

As in typical MANETs, each of mobile nodes 104 may communicate with other nearby nodes via ad-hoc communication links 112. For example, mobile node 104(5) may communicate with one or both of mobile nodes 104(4) and 104(6) via MANET links 112. Further, mobile node 104(4) may communicate with mobile node 104(6) via mobile node 104(5) and MANET links 112. MANET links 112 may be established and operated in accordance with a MANET protocol operated by each node of MANET 100 (e.g., each of mobile nodes 104 and stations 102).

In some embodiments, each station 102 may include a MANET node 114 and a backbone access node 116. A given station 102 may employ MANET node 114 to communicate with one or more mobile nodes 104 (e.g., via MANET links 112), and employ backbone access node 116 communicate with one or more other stations 102 (e.g., via backbone 110). Thus, each station 102 may route data between two wireless networks: MANET links 112 and backbone 110. Backbone 110 provides efficient and stable end-to-end connectivity between key nodes (e.g., stations 102). MANET links 112 provide opportunistic, ad-hoc connectivity to nodes beyond the coverage area of backbone 110. Station 102 may route data between MANET links 112 and backbone 110 using any suitable routing protocol. Further, stations 102 may be coupled to, or include, larger power sources (e.g., portable or mobile generators, not shown) to enable higher power transmissions than mobile nodes 104, which may be solely battery powered.

In an embodiment, MANET node 114 and backbone access node 116 may be physically separate devices joined by a communication link (not shown). For example, MANET node 114 and backbone access node 116 may be two wireless communications devices (e.g., nodes) tethered together by a wired connection, such as an Ethernet connection. In an embodiment, a given station 102 may be formed by coupling a first wireless node and a second wireless node, and setting them to operate as a station with one of the wireless nodes operating as MANET node 114 and the other wireless node operating as backbone access node 116. Although MANET node 114 and backbone access node 116 are shown in FIG. 1 as being geographically co-located, other embodiments may employ geographically separated nodes.

In described embodiments, MANET node 114 and backbone access node 116 may operate using diverse technology, so as to provide simultaneous communications with mobile nodes 104 and other stations 102 without interference. For example, MANET node 114 and backbone access node 116 may operate at separate frequencies (or ranges of frequencies). Operating backbone 110 and MANET links 112 at separate frequencies (or ranges of frequencies) provides backbone 110 with some immunity from hidden node problems and exposed node problems, which can occur frequently in MANETs, and provides isolation for mobile nodes from asymmetric links that the more powerful backbone nodes would otherwise introduce. Similarly, MANET node 114 and backbone access node 116 may operate in accordance with separate communications protocols and/or separate physical media. For example, MANET node 114 may be a bidirectional radio, while backbone access node is an optical transceiver, such as a laser. In general, mobile nodes 104 and stations 102 may be orthogonal frequency-division multiplexed (OFDM) radio systems.

In described embodiments, each station 102 may be coupled to at least one tall mast antenna to facilitate communication over a greater distance. For example, stations 102 may employ a tall mast and one or more directive antennas to improve line of sight (LOS) connectivity with other stations. In such embodiments, backbone access node 116 may be coupled to one or more directional antennas to focus wireless signals between stations 102. Additionally, or alternatively, stations 102 may employ a tall mast and an omnidirectional antenna (or antenna array) to improve a coverage area of communication with mobile nodes 104. In such embodiments, MANET node 114 may be coupled to one or more omnidirectional antennas (or arrays) to provide substantially uniform wireless coverage for mobile nodes 104 over a given geographic area proximate to station 102. Thus, stations 102 may provide end-to-end connectivity with fewer hops, resulting in lower end-to-end delay and higher throughput of backbone 110, but without building permanent infrastructure.

Although shown in FIG. 1 as being separate devices, in other embodiments, MANET node 114 and backbone access node 116 may be a single device. For example, MANET node 114 and backbone access node 116 may employ separate channels of a shared wireless transceiver, or separate transceivers of a single device.

Although shown in FIG. 1 as having stationary nodes 102 and backbone network 110, described embodiments may also operate in a purely ad-hoc manner (e.g., "pure MANET") without establishing backbone 110. Thus, a backbone 110 may be established during operation of MANET 100 without interrupting communications of mobile nodes 104. Further, backbone 110 may be disabled, or torn down, during operation of MANET 100 without interrupting communications of mobile nodes 104. Thus, backbone 110 may be established to, at least temporarily, increase connectivity, efficiency and throughput of MANET 100.

Described embodiments schedule access to backbone 110 by stations 102. Described embodiments may achieve increased scheduling efficiency over typical MANET scheduling processes, for example over a 66% increase in scheduling efficiency. Referring to FIG. 2A, an illustrative diagram of node activation probabilities achieved by a scheduling algorithm known as Node Activation Multiple Access (NAMA) for five nodes in a string configuration is shown. NAMA is intended to provide fair channel access to nodes in a MANET system. For example, the five node string shown in FIGS. 2A and 2B may be a string of stations 102 arranged in backbone 110.

As shown in FIG. 2A, the probability with which NAMA activates each node in an illustrative 5 node string backbone decreases as the node location is closer to the middle of the string. For example, the edge nodes (e.g., node 1 and node 5) each achieve a 1/3 activation probability, the interior nodes (e.g., node 2 and node 4) each achieve a 1/4 activation probability, and the center node (e.g., node 3) has the lowest node activation probability, 1/5. For example, if the channel can support a total throughput of 10 MB/s, node 3 will achieve a throughput of approximately 1/5 of that total, or 2 MB/s. Meanwhile, node 1 and node 5 will each achieve a throughput of approximately 1/3 of that total, or 3.3 MB/s and node 2 and node 4 will achieve a throughput of approximately 1/4 of that total, or 2.5 MB/s. While other nodes (e.g., nodes 1, 2, 4 and 5) can push data onto backbone at higher data rates, the backbone's end-to-end throughput will be limited by the rate at which data can flow through node 3. Thus, Node 3 is a bottleneck in the illustrative backbone shown in FIG. 2A.

To show why NAMA, as illustrated in FIG. 2A, achieves inefficient nodes (e.g., bottleneck node 3), allow that at any given instant, a network can be modeled as a graph G(V, E). Each vertex i∈V represents a node of the network. An edge {i,j}∈E indicates that the nodes represented by vertices i and j can communicate directly with one another. The open neighborhood N(i) of a vertex i∈V is given by N(i):={j∈V: {i,j}∈E}. In other words, N(i) is the set of all nodes one hop away from node i. The closed neighborhood of node i is the set N[i]:={i}∪N(i). Similarly, $N_2(i)$ is the set of all neighbors within two hops of node i and $N_2[i]=\{i\}\cup N_2(i)$.

Nodes generally do not possess a global view of MANET 100 (e.g., a given node may not know all of the nodes in MANET 100, or the overall structure of MANET 100). NAMA requires only that the view of any node i extends as far out as $N_2(i)$. NAMA also requires that at each time slot t, all nodes compute the same permutation σ(t) of the vertices in V. Ideally, this computation approximates a random drawing from the set, Ω, of all such permutations, such that each permutation occurs with equal probability and the permutation generated for one time slot is statistically independent of the permutation generated for any other time slot. The image of vertex i under the permutation σ(t) is denoted by $σ_i(t)$. In NAMA, the activation state $A_i(t)$ of node i during time slot t is given by $$A_i(t)=(\forall j\in N_2(i))\sigma_i(t)>\sigma_j(t) \quad (1).$$

If the indicator variable $A_i(t)$ evaluates to TRUE, node i will transmit on time slot t. Otherwise, node i will receive. NAMA activates node i on time slot t if the activation priority $σ_i(t)$ of node i at time slot t exceeds the activation priority of every node $j\in N_2(i)$. It follows from equation (1), and the uniform probabilities of the sample points in the permutation set Ω, that node i transmits on any given time slot t with probability $$\frac{1}{|N_2[i]|},$$

where $|N_2[i]|$ denotes the size of the set $N_2[i]$. The probability of activating a given set S of nodes on the same time slot can be calculated by counting those permutations in the permutation set Ω for which equation (1) evaluates to TRUE if and only if i∈S. The probability of activating all nodes in S and no others is obtained by dividing the number of these favorable cases by the total number of points in the permutation set Ω.

Described embodiments, however, reduce (or ideally eliminate) bottleneck nodes by allowing each node i to masquerade as some other node α(i) to the channel access scheduler. In such embodiments, channel activation is given by:

$$A_i(t)=\neg(\exists j\in N_2(i))\sigma_{\alpha(i)}(t)<\sigma_{\alpha(j)}(t) \quad (2).$$

In other words, in described embodiments, node i activates unless the channel access priority of the alias used by one of node i's two-hop neighbors exceeds the channel access priority of node i's own alias. Thus, described embodiments reduce the contention set of interior nodes of backbone 110, as shown in FIG. 2B. As shown in FIG. 2B, nodes colored white (e.g., node 1 and node 4) adopt the alias 1, nodes with hash marking (e.g., node 2 and node 5) adopt the alias 2, and the node colored gray (e.g., node 3) adopts the alias 3. Each node sees only two competitors for the channel (e.g., backbone 110), so each node is activated with probability 1/3. As shown in FIG. 2B, described embodiments achieve uniformly maximized node activation probabilities and eliminate bottleneck nodes (e.g., all nodes achieve uniform activation probabilities).

Table 1A shows that more than half of the network activation states NAMA generates are inefficient. Any time NAMA activates node 1 by itself, for example, represents a wasted opportunity to activate node 1 and node 4 simultaneously. Table 1B shows that described embodiments achieve improved efficiency by trimming out inefficient network activation states. FIG. 2(b) shows the result:

TABLE 1

Network Activation States for a 5 Node String Backbone

Table 1A: NAMA

| Activated Notes | Probability |
|---|---|
| {1} | 10/120 |
| {1, 4} | 14/120 |
| {1, 5} | 16/120 |
| {2} | 16/120 |
| {2, 5} | 14/120 |
| {3} | 24/120 |
| {4} | 16/120 |
| {5} | 10/120 |

Table 1B: NAMA + Masquerading Nodes

| Activated Notes | Probability |
|---|---|
| {1, 4} | 1/3 |
| {2, 5} | 1/3 |
| {3} | 1/3 |

Channel access for backbone 110 can be determined given a function $\alpha: V \rightarrow \mathbb{N}$ that assigns each node i an alias $\alpha(i)$ in such a way that no node shares an alias with any of its two-hop neighbors.

Described embodiments assign each backbone node (e.g., each station 102 of backbone 110) an alias to facilitate scheduling access to backbone 110. As shown by FIGS. 3A and 3B, the manner in which described embodiments assign aliases can be illustrated as a graph coloring problem, with each color representing an alias. Described embodiments, first assigns an alias to an initial node (e.g., colors an initial node), $\omega$, then successively assigns aliases to the remaining nodes in order of their proximity to $\omega$ (e.g., colors the remaining nodes in order of their proximity to/distance from $\omega$). For nodes that are equally far from the initial node, $\omega$, nodes may be assigned aliases based upon criteria such as a node ID value, although other criteria may be employed. In described embodiments, the node ID value may be a hardware serial number such as a media access control (MAC) address. For example, an alias may be assigned to nodes having the same distance in order of serial number such that a node with a lower serial number is assigned an alias first.

Described embodiments employ an alias function $\alpha: V \rightarrow \mathbb{N}$ to assign an alias (e.g., color) to each node. An alias (e.g., a color) is assigned such that no two nodes (e.g., vertices) within two hops of one another share the same alias (color). An alias assignment (e.g., a coloring) is optimal if it uses the fewest possible aliases (colors) and the closed two-hop neighborhood of every node (vertex) contains the same number of aliases (colors).

FIG. 3A shows an illustrative alias assignment for the case of five nodes (e.g., stations) in a string configuration of backbone 110. As shown in FIG. 3A, nodes 1 and 4 are assigned a first alias, nodes 2 and 5 are assigned a second alias, and node 3 is assigned a third alias, similarly as described in regard to FIG. 2B. As shown in FIG. 3A, none of node 1's two-hop neighbors (e.g., node 2 and node 3) share node 1's alias. Similarly, none of node 2's two-hop neighbors (e.g., node 1, node 3 and node 4) share node 2's alias, none of node 3's two-hop neighbors (e.g., node 1, node 2, node 4 and node 5) share node 3's alias, and so on. Further, the two-hop neighborhoods for both central nodes (or vertices, such as nodes 2, 3 and 4) each contain three aliases (colors). For example, node 2's two-hop neighborhood includes the alias for nodes 1 and 4 (color white), the alias for node 3 (color gray), and the alias for node 2 itself (hash mark).

FIG. 3B shows an illustrative alias assignment for the case of 64 nodes (e.g., stations) arranged in a grid configuration of backbone 110. As shown in FIG. 3B, the concept of scheduling two-hop neighborhoods can be applied to larger and/or more complex network topologies such that all nodes have higher channel access probabilities by using the aliases that could be achieved based on each node's ID value.

To initialize a given node, i, of backbone 110 (e.g., each station 102), described embodiments define the following parameters. Node i's view of the network includes N(i) (e.g., node i itself and node i's direct (one-hop) neighbor nodes) and $N_2(i)$ (e.g., node i's two-hop neighbor nodes). Node i also is aware of a backbone originator node, $\omega$, where alias assignment (e.g., coloring) started at time $\tau$. Further, node i is aware of the function $\delta | N_{2(i)}$, which gives the distance to the originator node $\omega$ for each node in node i's two-hop neighborhood $N_2(i)$. Node i is also aware of the function $\alpha | N_2(i)$, which gives the alias of each node in node i's two-hop neighborhood $N_2(i)$. Each node also maintains a local function $m: V \rightarrow \mathbb{Z}$ which counts messages it has received from each neighbor. Each node may retain this information about MANET 100 in a state information table such as will be described in regard to FIG. 12.

These state variables are initialized for each node by:

$N(i) \leftarrow \emptyset, N_2(i) \leftarrow \emptyset, \omega \leftarrow 0, \tau \leftarrow 0$, and for all $j \in V, \delta(j) \leftarrow \infty, \alpha(j) \leftarrow 0, m(j) \leftarrow 0$ Backbone nodes (e.g., stations 102 of backbone 110) discover the local structure of the network and communicate that structure to one another by passing coordination messages. In some embodiments, each node has a time slot reserved for sending coordination messages to other nodes. During these time slots, node i sends $\langle \omega, \tau, N(i), \delta | N(i), \alpha | N(i) \rangle_i$ to each of its neighbor nodes.

A given node, node i, processes a coordination message from a given node j and incorporates the information from node j into node i's local view of the network. This process is described mathematically by the following:

Node i receives $\langle \omega, \tau, N(j), \delta | N(j), \alpha | N(j) \rangle_j$ from node j, $N(j) \leftarrow \langle N(j) \rangle_j, N(i) \leftarrow N(i) \cup \{j\}, N_2(i) \leftarrow N(i)$, for all $k \in N(i): N_2(i) \leftarrow N_2(i) \cup N(k)$, $N_2(i) \leftarrow N_2(i) \setminus \{i\}$, if $\omega = \langle \omega \rangle_j$ and $\tau = \langle \tau \rangle_j$, then
    $\omega \leftarrow \langle \omega \rangle_j$,
    $\tau \leftarrow \langle \tau \rangle_j, \delta(i) \leftarrow \infty$, $\delta(j) \leftarrow \langle \delta(j) \rangle_j, \alpha(j) \leftarrow \langle \alpha(j) \rangle_j$ for all $k \in N(i)$, if $k \notin N(j)$, then if $\delta(k) = \infty$
    and $\langle \delta(k) \rangle_j \neq \infty$, then $\delta(k) \leftarrow \langle \delta(k) \rangle_j$.

else if $\alpha(k) = 0$ and $\langle \alpha(k) \rangle_j \neq 0$, then $\alpha(k) \leftarrow \langle \alpha(k) \rangle_j$, if $(\exists k \in N(i)) \delta(k) \neq \infty$, then $m(j) \leftarrow m(j) + 1$.

Nodes exchange information sequentially. Each repetition of the above coordination sequence is called a coordination round or a round. Each round, a given node i performs the following:

if $\omega \neq 0$, then if $\delta(i) = \infty$, then if $\omega \in N(i)$, then $\delta(i) \leftarrow 1$ else $X_\delta = (\exists j \in N(i)) \delta(j) \neq \infty$ and $X_m = (\forall j \in N(i)) m(j) \geq M$ if $X_\delta$ and $X_m$, then $\delta(i) \leftarrow \min\{\delta(j): j \in N(i)\} + 1$ if $\alpha(i) = 0$, then if $(\forall j \in N_2(i)) \delta(j) \neq \infty$, then $A \leftarrow \{j \in N_2(i): \alpha(j) \neq 0\}, B \leftarrow \{j \in N_2(i): \delta(j) < \delta(i)\}$, and $C \leftarrow \{j \in N_2(i): (\delta(j) = \delta(i))^\smallfrown (j < i)\}$ if $B \subset A$ and $C \subset A$, then $\alpha(i) \leftarrow \min(\mathbb{N} \setminus \{(\alpha(j): j \in A\})$ Node i discovers $\delta(i)=1$ as soon as it discovers $\omega$ is a one-hop neighbor. Otherwise, node i waits until at least one neighbor has reported its distance to $\omega$ (indicated by $X_\delta$) and node i has subsequently received at least M messages from every neighbor (indicated by $X_m$). When these conditions are met, node i concludes that it is one hop farther away from $\omega$ than whichever of its neighbors happens to be closest to $\omega$.

Node i waits until all of its two-hop neighbors closer to $\omega$ (those nodes in set B) and all of its two-hop neighbors equally close to $\omega$ that have smaller node IDs (those nodes in set C) have assumed aliases. When both of these conditions are met, node i adopts the smallest alias not already in use within its two-hop neighborhood.

A given node i initiates the process of assigning aliases (e.g., coloring the backbone) at time t such that no two vertices within two hops of one another share the same alias (e.g., color). Ideally, the fewest possible colors are used and the closed two-hop neighborhood of every vertex contains the same number of colors. To assign aliases (e.g., color the backbone), each node performs: $\Omega \leftarrow i$, $\tau \leftarrow t$, $\delta(i) \leftarrow 0$, $\alpha(i) \leftarrow 1$.

The processes described mathematically above will now be described in regard to the flow charts shown in FIGS. 4-11 and 14.

Figure 4A:
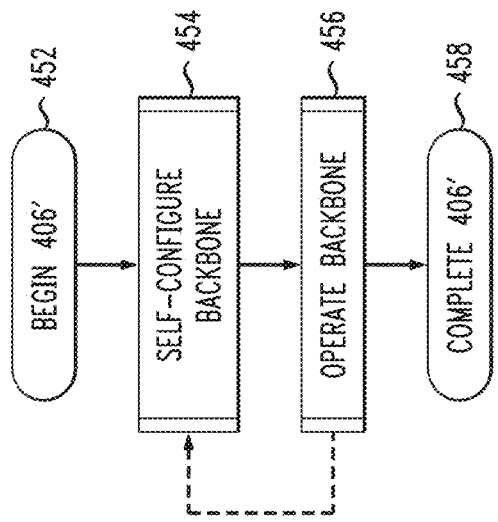
FIG. 4A is a flow diagram showing additional detail of the illustrative process of FIG. 4 in accordance with described embodiments.
Figure 4:
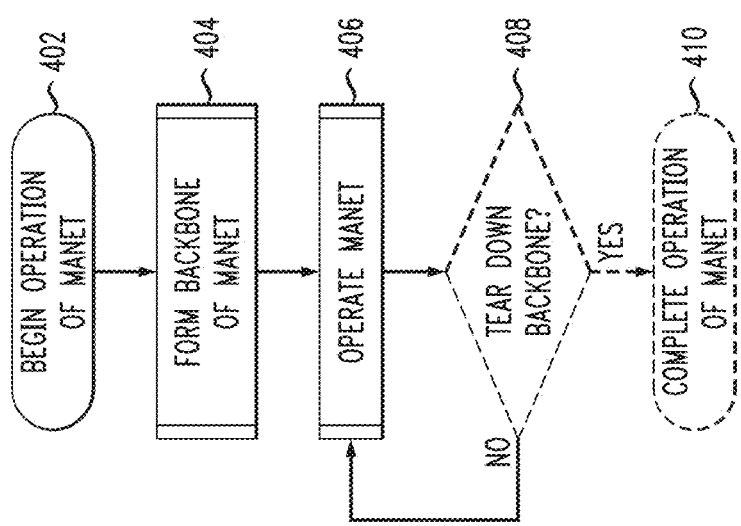
FIG. 4 is a flow diagram showing an illustrative process for operating the MANET of FIG. 1 in accordance with described embodiments.

Referring to FIG. 4, a flow diagram of illustrative process 400 for operating MANET 100 is shown. Process 400 begins at block 402, for example when one or more MANET nodes are powered and in communication with one another. At block 404, a backbone of MANET 100 (e.g., backbone 110) is formed. For example, a backbone may be formed when operator(s) set one or more MANET nodes to operate as backbone stations (e.g., stations 102). At block 406, MANET 100 is operated. At block 408, backbone 110 may optionally be torn down, for example if a deployment has ended and backbone 110 is no longer needed. Nodes 102 and 104 may then return to operation in a purely ad-hoc manner. At block 410, operation of MANET 110 may optionally complete.

Although shown in FIG. 4 as having a formed backbone, described embodiments may also operate in a purely ad-hoc manner (e.g., "pure MANET") without forming backbone 110, or backbone 110 may be set up or torn down during operation of MANET 100 without interrupting communications of mobile nodes 104.

Additional detail of MANET operation block 406 is shown in FIG. 4A as process 406'. At block 452, process 406' starts. At block 454, backbone 110 is self-configured. At block 456, backbone 110 is operated as part of MANET 100. As indicated by the dashed line, backbone 110 may re-configure itself during operation of the backbone, for example as one or more backbone nodes (e.g., stations 102) are added or removed from backbone 110. At block 458, process 406' completes.

Figure 5:
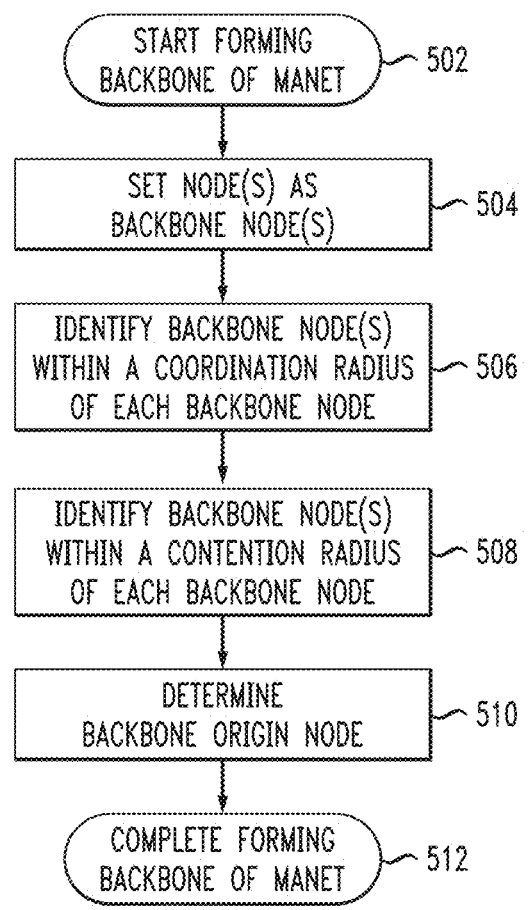
FIG. 5 is a flow diagram showing an illustrative process for forming a backbone of the MANET of FIG. 1 in accordance with described embodiments.

FIG. 5 shows additional detail of backbone forming block 404 of FIG. 4, shown as process 404'. At block 502, process 404' starts. At block 504, operator(s) set one or more MANET nodes to operate as backbone stations (e.g., stations 102) and form backbone 110. At block 506, each backbone node (e.g., station 102) identifies other backbone nodes (e.g., other stations 102) within a coordination radius or coordination neighborhood. In an embodiment, the coordination radius may be one-hop (e.g., a given node i can establish a direct connection with nodes in its coordination radius). At block 508, each backbone node (e.g., station 102) identifies other backbone nodes (e.g., other stations 102) within a contention radius or contention set. In an embodiment, the contention radius may be two-hops. At block 510, each backbone node (e.g., station 102) identifies the backbone origin node or backbone originator (e.g., the first activated backbone node). At block 512, process 404' completes.

Figure 6:
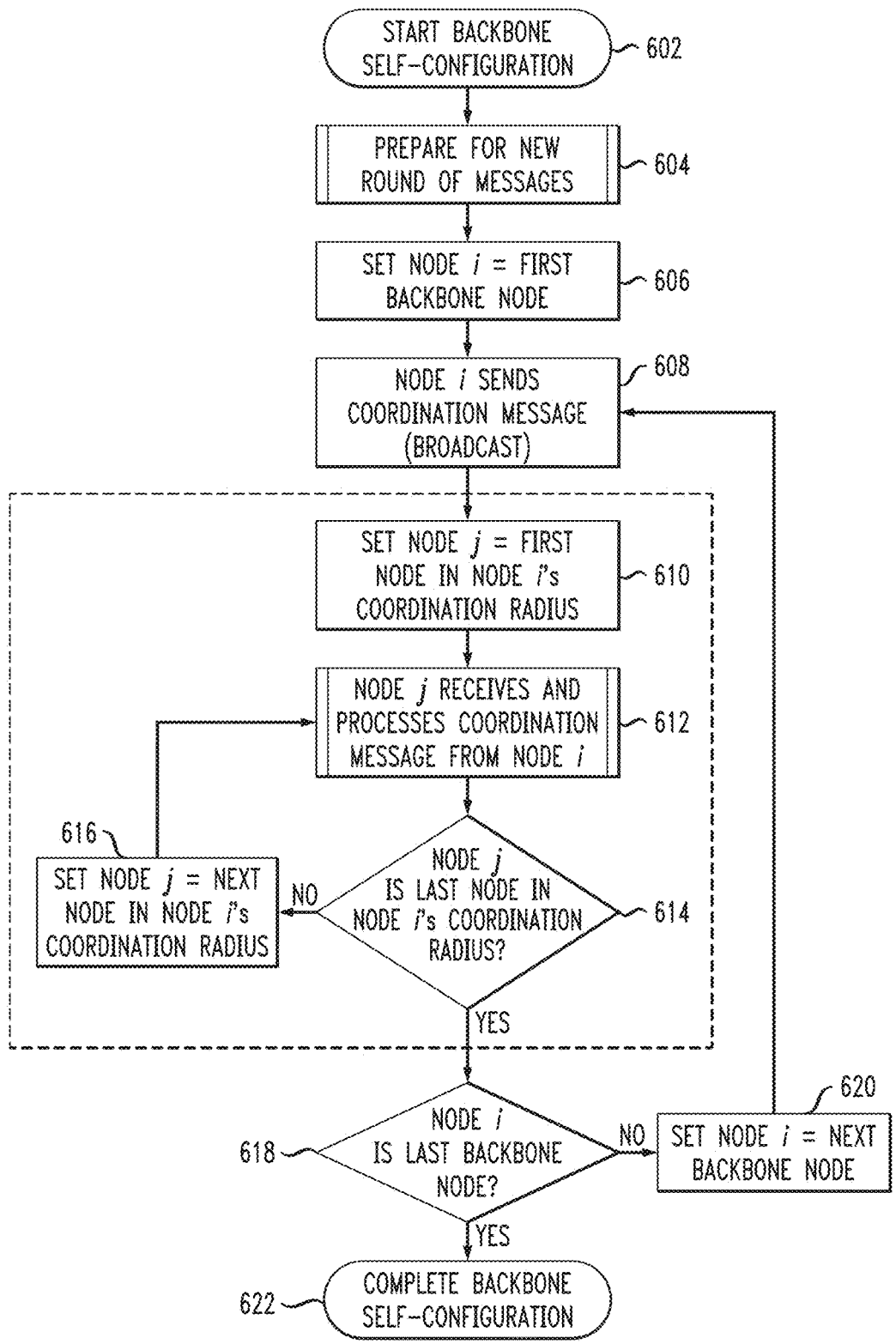
FIG. 6 is a flow diagram showing an illustrative process for self-configuring a backbone of the MANET of FIG. 1 in accordance with described embodiments.

FIG. 6 shows additional detail of backbone self-configuration block 454 of FIG. 4A, shown as process 454'. As will be described, backbone self-configuration process 454' may be performed over the course of one round of coordination messages between backbone nodes (e.g., stations 102). In a round of messages, each station 102 participating in backbone 110 transmits one coordination message, for example in an associated time slot. Process 454' may be repeated by each node of backbone 110 and also repeated over one or more rounds of coordination messages.

As shown in FIG. 6, at block 602, process 454' starts. At block 604, each node i of backbone 110 prepares for a new round of coordination messages. Block 604 is described in greater detail in regard to FIG. 7. At block 606, a first backbone node is set to be the current node, node i. In some described embodiments, blocks 608-620 may be iteratively repeated to provide all nodes in the backbone a turn to send a coordination message.

At block 608, the current node, node i, sends a coordination message, for example as a broadcast message, to one or more nodes within node i's coordination radius. In some embodiments, node i may track state information, for example as described in regard to FIG. 12. At least some of the tracked state information may be sent as a coordination message to one or more nodes within node i's coordination radius. In some embodiments, the coordination message may include data as described in regard to FIG. 13.

At block 610, a given node, node j, in node i's coordination radius receives the coordination message sent by node i at block 608. At block 612, node j receives and processes the coordination message sent by node i at block 608. Block 612 is described in greater detail in regard to FIG. 8. At block 614, if node j is the last node in node i's coordination radius, then process 454' continues to block 618. If, at block 614, node j is not the last node in node i's coordination radius, then process 454' continues to block 616, where j is incremented such that the next node of node i's coordination radius can process node i's coordination message at block 612. As indicated by dashed line 609, one or more nodes j may concurrently receive and process node i's coordination message (e.g., blocks 610, 612, 614 and 616). For example, if node i broadcasts its coordination message using an omnidirectional antenna, any nodes within range may receive and process that coordination message concurrently. Similarly, if node i sends its coordination message using a directional antenna, then nodes may receive and process that message sequentially.

At block 618, if node i is the last backbone node (e.g., station 102) that needs to send a coordination message, then at block 622, process 454' completes. If, at block 618, there are other backbone nodes (e.g., stations 102) that need to send a coordination message, then at block 620, i is incremented to allow a next backbone node to send a coordination message at block 608.

Figure 7:
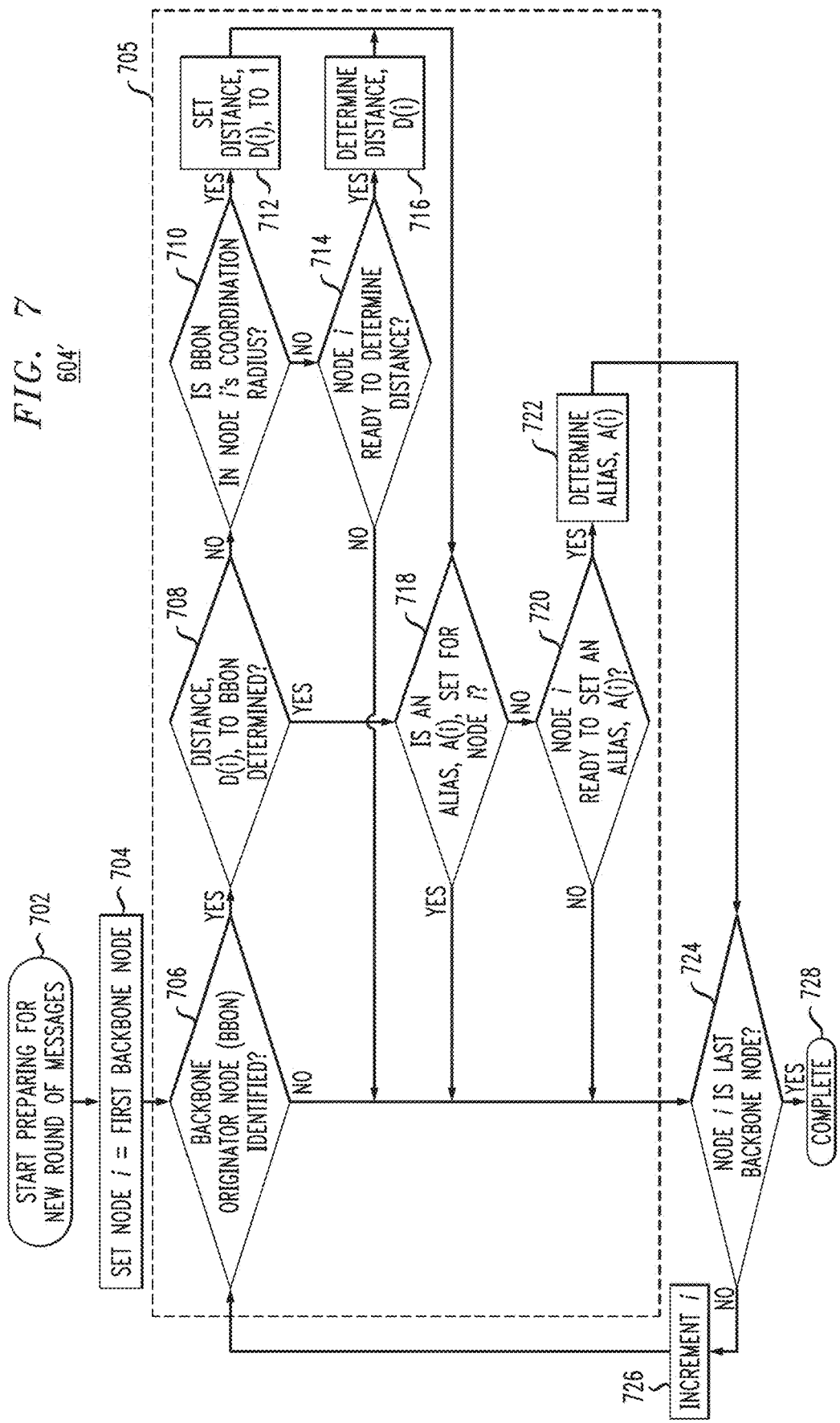
FIG. 7 is a flow diagram showing an illustrative process for preparing for a new round of coordination messages in support of the backbone configuration process of FIG. 6 in accordance with described embodiments.

FIG. 7 shows additional detail of block 604 of FIG. 6, shown as process 604'. At block 702, process 604' starts. At block 704, a first backbone node is set to be the current node, node i. At block 706, node i determines if the originator node of backbone 110 (e.g., backbone originator node, or BBON) has been identified, for example by checking the state information (e.g., 1204) such as described in regard to FIG. 12. If, at block 706, node i has not identified the backbone originator node, then process 604' proceeds to block 724.

If, at block 706, node i has identified the backbone originator node, then at block 708, node i determines whether it has established its distance to the backbone originator node (e.g., entry 1224 of FIG. 12). If, at block 708, node i has already established its distance to the backbone originator node, then at block 718, node i determines whether it has an assigned alias. For example, at block 718, node i examines its state variables (e.g., 1220 of FIG. 12) to determine whether it has adopted an alias. If the alias element corresponding to node i holds the value TBD, node i has not yet adopted an alias.

If, at block 718, node i has an assigned alias, A(i), then process 604' proceeds to block 724. If, at block 718, node i does not have an assigned alias, A(i), then at block 720, node i determines whether it is ready to determine an alias. If, at block 720, node i is not ready to determine an alias (e.g., node i has not yet received enough information about its neighbor nodes), then process 604' proceeds to block 724. For example, at block 722, node i may be ready to adopt an alias if the following conditions are met: (1) every node in node i's contention neighborhood has established its distance to the backbone originator node; (2) every node in node i's contention neighborhood that is closer than node i to the backbone originator node already has an alias; and (3) every node in node i's contention neighborhood that has the same distance as node i to the backbone originator node and has a smaller node ID than node i already has an alias. If, at block 720, node i is ready to determine an alias (e.g., node i has received sufficient information from its neighbor nodes, e.g., via coordination messages), then at block 722, node i determines an alias. For example, at block 722, node i may adopt the smallest alias value that has not already been taken by any node in its contention neighborhood.

If, at block 708, node i has not already established its distance to the backbone originator node, then at block 710, node i determines whether the backbone originator node is within node i's coordination radius (e.g., in some embodiments, node i's one-hop neighborhood). If the backbone originator node is within node i's coordination radius, then in embodiments where the coordination radius is one-hop, then at block 712, node i's distance, D(i), to the backbone originator node is set to 1. After block 712, process 604' proceeds to block 718. For example, at block 710, if node i holds the backbone originator node as one of the nodes in its coordination neighborhood (e.g., entry 1230 of FIG. 12), then at block 712 node i computes its distance to the backbone originator node as 1.

If, at block 710, the backbone originator node is not within the coordination radius of node i, then at block 714, node i determines whether it has received enough information from its neighbor nodes to determine its distance to the backbone originator node. For example, at block 714, node i may have enough information to determine its distance to the backbone originator node if the following conditions are met: (1) node i has received an estimated distance to the BBON from at least one node in node i's coordination neighborhood; and (2) node i has received a threshold number (e.g., the threshold set by the value of countdown 1208 of FIG. 12) of coordination messages from each node in its coordination neighborhood (each node i may track the number of coordination messages it has received from each node in its coordination neighborhood by M counter entry 1228 of FIG. 12). If, at block 714, these conditions are met, then at block 716 node i estimates its distance to the backbone originator node using the information obtained from its neighbor nodes. For example, at block 716, node i determines its distance to the backbone originator node as one greater than the smallest distance provided from any of the nodes in its coordination neighborhood. If, at block 714, these conditions are not met, process 604' proceeds to block 724.

At block 724, if node i is the last backbone node in backbone 110, then process 604' completes at block 728. If, at block 724, node i is not the last node in backbone 110, then process 604' proceeds to block 726, where i is incremented such that process 604' can be iteratively repeated for each node of backbone 110. As indicated by dashed line 705, one or more nodes i may concurrently determine state information about the MANET network (e.g., blocks 706-722). Alternatively, in some embodiments, one or more nodes i may perform block 705 sequentially.

Figure 8:
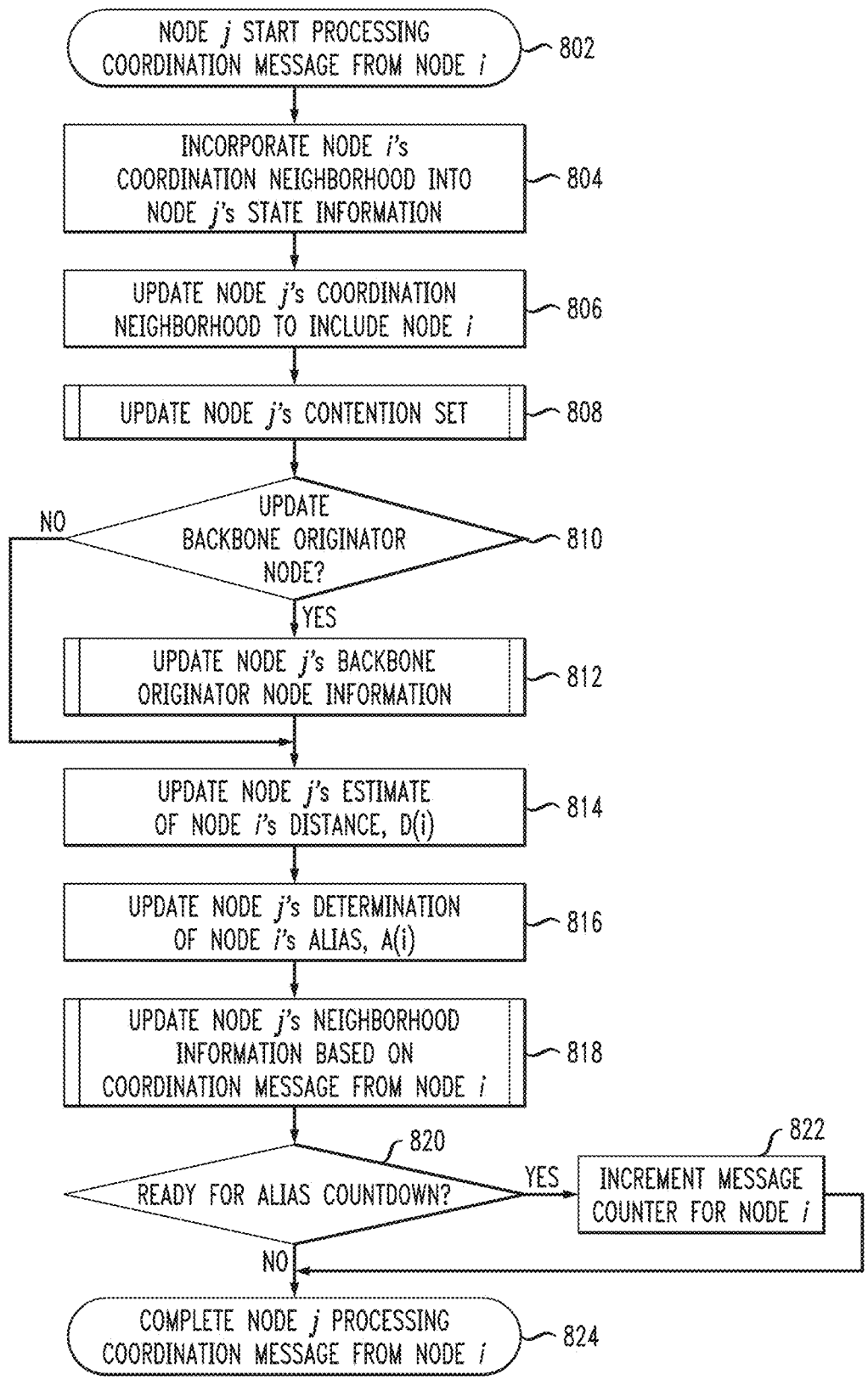
FIG. 8 is a flow diagram showing an illustrative process for processing coordination messages of the backbone configuration process of FIG. 6 in accordance with described embodiments.

FIG. 8 shows additional detail of block 612 of FIG. 6, shown as process 612'. FIG. 8 shows how node j processes a coordination message (e.g., coordination message 1300 of FIG. 13) received from node i and updates its state information (e.g., table 1200 of FIG. 12). At block 802, a given node, node j, starts processing a coordination message received from node i. At block 804, the coordination message (e.g., 1300) broadcast by node i provides one or more nodes (e.g., node j) with node i's coordination neighborhood information (e.g., 1308). Node j incorporates, into its own state information (e.g., entry 1230 of table 1200), the information broadcast by node i. At block 806, node j's coordination neighborhood is updated to include Node i. At block 808, node j uses the information broadcast by node i to update its own contention set (e.g., node j's contention neighborhood entry 1210). Block 808 is described in greater detail in regard to FIG. 9.

At block 810, node j determines whether the information broadcast by node i requires node j to update its estimates about the backbone originator node (e.g., which node is the backbone originator node, or node j's distance to the backbone originator node). For example, at block 810, node j's information about the backbone originator node should be updated if the following two conditions are met: (1) the originator node indicated by node i in its coordination message (e.g., originator entry 1304) is a valid node ID, and (2) the origination time indicated by node i in its coordination message (e.g., origination time entry 1306) is more recent than the origination time previously stored by node j (e.g., in entry 1206). If, at block 810, these conditions are met, then at block 812, node j updates its information for the backbone originator node, and process 612' proceeds to block 814. Such conditions may, for example, allow an originator node to leave backbone 110 and allow another backbone node to assume the role of originator node. If, at block 810, the conditions are not met, then process 612' skips block 812 and proceeds to block 814. Block 812 is described in greater detail in regard to FIG. 10.

At block 814, node j's estimate of node i's distance, D(i), to the backbone originator node is updated. At block 816, node j's determination of node i's alias, A(i), is updated. For example, node i broadcasts the alias it has adopted in its coordination message (e.g., as entry 1326). Node j incorporates the alias of node i into its own internal state information (e.g., alias entries 1226). At block 818, node j's neighborhood information is updated in response to node i's coordination message. Block 818 is described in greater detail in regard to FIG. 11. At block 820, node j determines if it is ready to begin counting down toward its alias determination threshold. For example, to be ready to count down to its alias determination threshold, node j has determined the distance to the backbone originator node from every node in its coordination neighborhood. If, at block 820, node j is ready to begin the alias countdown, then at block 822, the message counter for node j is incremented, for example node j's M counter (e.g., 1228) associated with node i is incremented (e.g., to indicate a message received from node i). Process 612' proceeds to block 824. If, at block 820, node j is not ready to begin the alias countdown (e.g., the distance to the backbone originator node from every node in its coordination neighborhood is not determined), then at block 824, process 612' completes.

Figure 9:
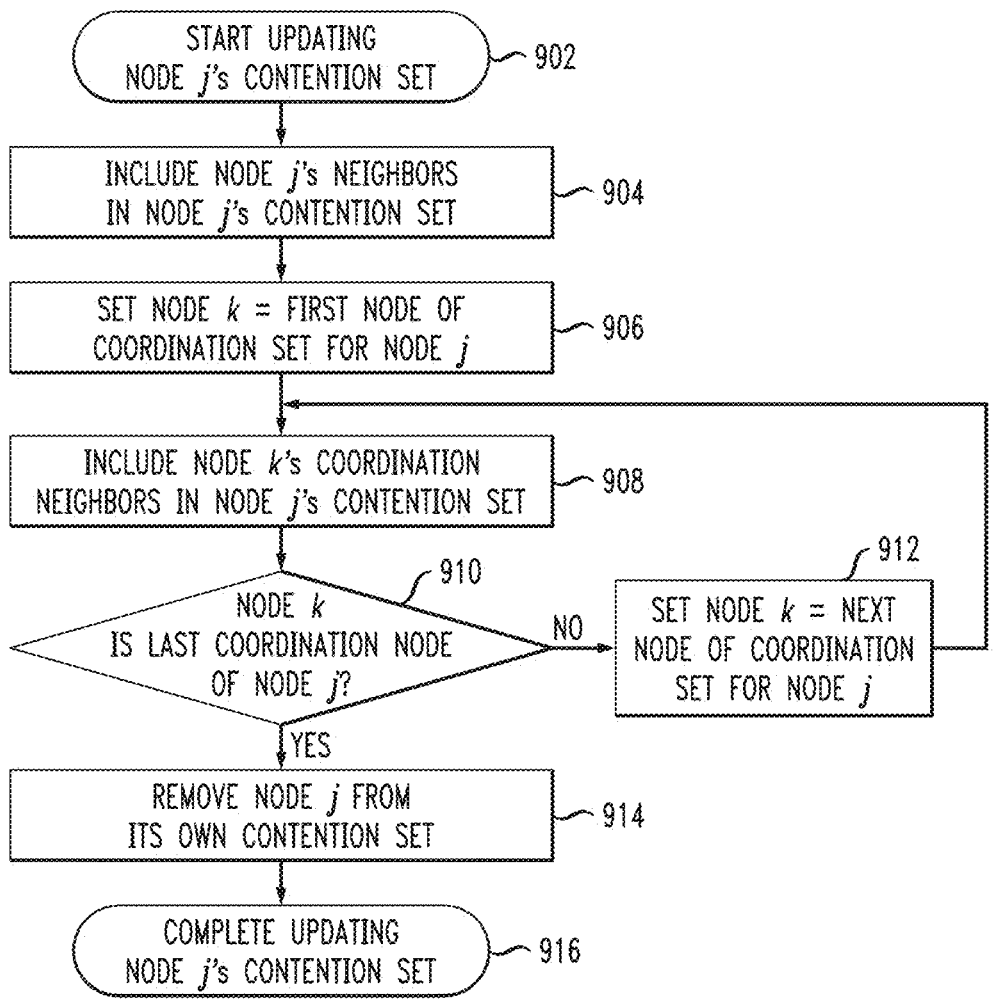
FIG. 9 is a flow diagram showing an illustrative process for updating contention set information of the process of FIG. 8 in accordance with described embodiments.

FIG. 9 shows additional detail of block 808 of FIG. 8 to update node j's contention set information, shown as process 808'. At block 902, process 808' starts. At block 904, node j updates its own contention set (e.g., contention neighborhood 1210 of FIG. 12) by placing the node ID of every node in its own coordination neighborhood into its own contention neighborhood. At block 906, a given node, node k, is set as the first node of node j's coordination set to, iteratively, include in node j's contention set the coordination neighbor nodes of each node, k, in node j's coordination set. At block 908, each of node k's coordination neighbor nodes are included in node j's contention set. At block 910, if there are more nodes in node j's contention neighborhood to process, then at block 912, k is incremented to set the next node from which node j incorporates coordination neighbor node information, and process 808' returns to block 908. If, at block 910, there are no more nodes in node j's contention neighborhood to process, then at block 914 node j removes itself from its own contention neighborhood. Process 808' completes at block 916.

Figure 10:
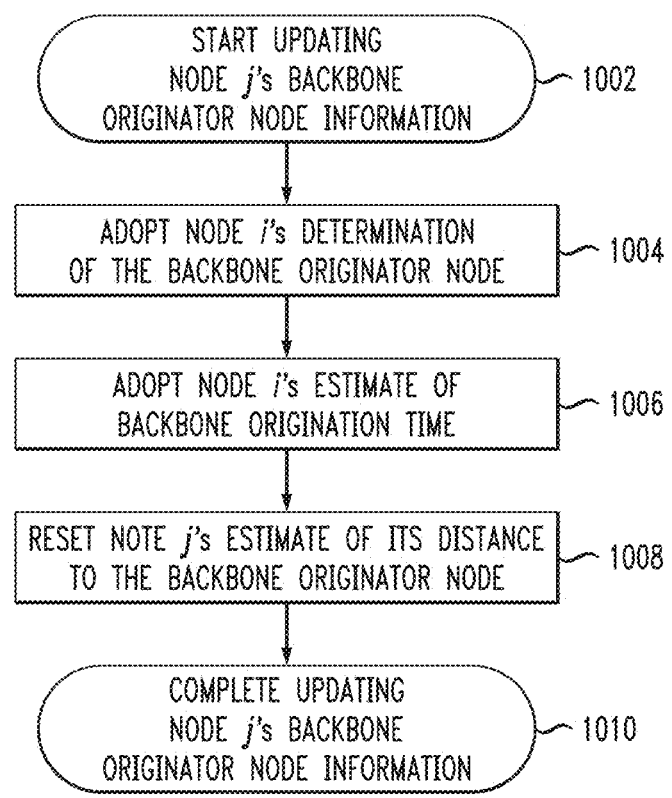
FIG. 10 is a flow diagram showing an illustrative process for updating backbone origination node information of the process of FIG. 8 in accordance with described embodiments.

FIG. 10 shows additional detail of block 812 of FIG. 8 to update node j's backbone originator node information, shown as process 812'. At block 1002, process 812' starts. At block 1004, node j incorporates the originator node ID broadcast by node i (e.g., entry 1304) into its own internal state information (e.g., entry 1204). At block 1006, node j incorporates the origination time broadcast by node i (e.g., entry 1306) into its own internal state information (entry 1206). At block 1008, node j resets its estimate of its distance to the backbone originator node. At block 1010, process 812' completes.

Figure 11:
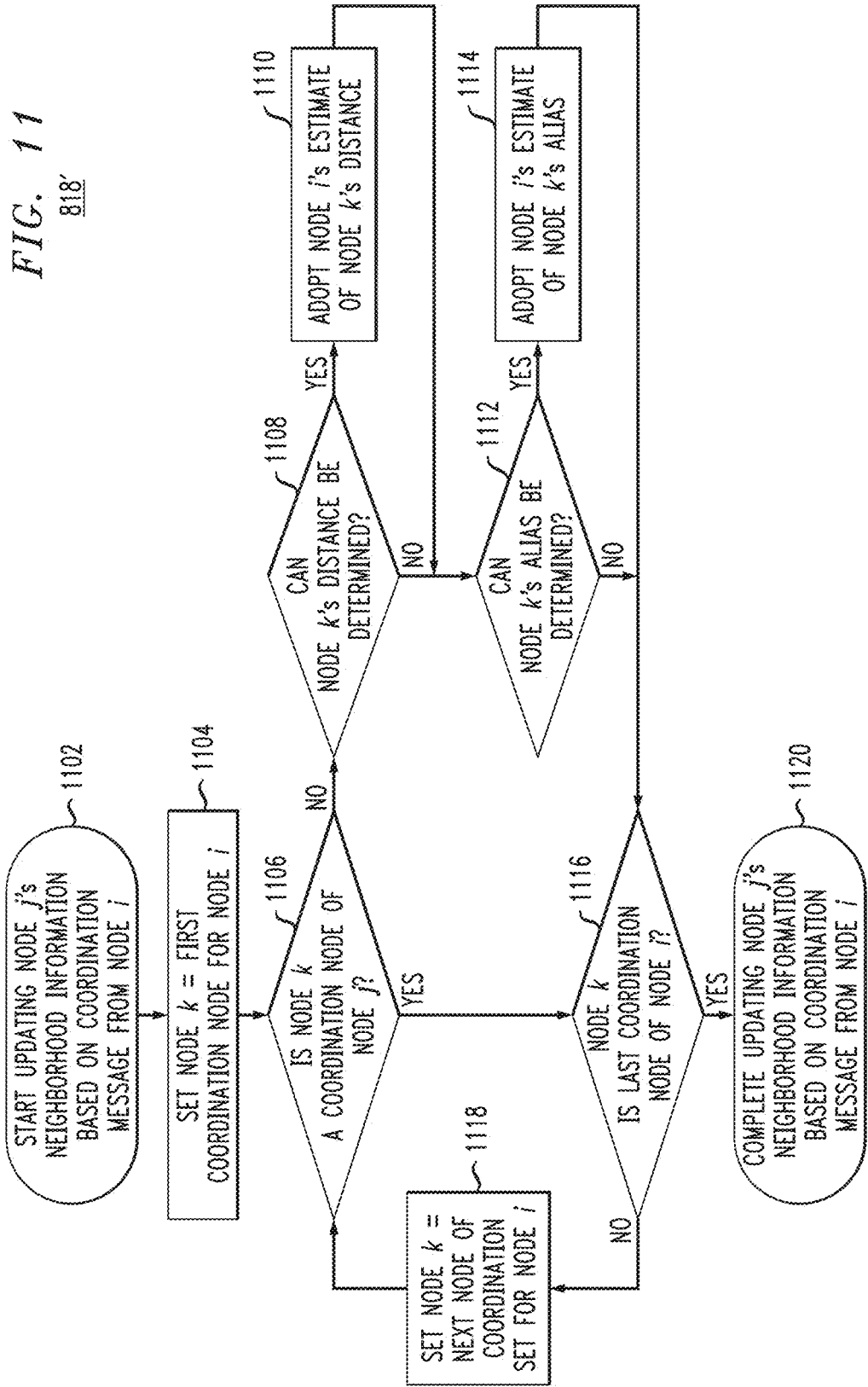
FIG. 11 is a flow diagram showing an illustrative process for updating coordination neighborhood information of the process of FIG. 8 in accordance with described embodiments.

FIG. 11 shows additional detail of block 818 of FIG. 8 to update node j's neighborhood information, shown as process 818'. The coordination message sent by node i publishes the distances (e.g., entries 1224) and aliases (e.g., entries 1226) of the nodes in its coordination neighborhood, as well as its own distance and alias. Node j updates its local information about these distances and aliases. At block 1102, process 818' starts. At block 1104, a given node, node k, is set as the first node of node j's coordination set to, iteratively, update node j's neighborhood information. At block 1106, node j determines whether node k is in node j's coordination neighborhood (e.g., via entries 1230). If, at block 1106, node k is in node j's coordination neighborhood, then at block 1108, node j determines whether node k's distance to the backbone originator node can be determined based upon information broadcast by node i. For example, node k's distance can be determined if: (1) node j's current estimate of the distance from node k to the backbone originator is undetermined, and (2) node i broadcast the distance from node k to the backbone originator. If, at block 1108, node k's distance can be determined, process 818' proceeds to block 1110. If, at block 1108, node k's distance cannot be determined, process 818' proceeds to block 1112.

At block 1110, node j adopts node i's estimate of node k's distance to the backbone originator node broadcast by node i and incorporates it into its local state information (e.g., entries 1224). Process 818' proceeds to block 1112. At block 1112, node j determines whether node k's alias can be determined from the information published by node i. For example, node k's alias can be determined if: (1) node j's current determination of node k's alias is undetermined, and (2) node i broadcast node k's alias to node j. If, at block 1112, node k's alias can be determined, process 818' proceeds to block 1114. At block 1114, node j adopts the estimate of node k's alias broadcast by node i and incorporates it into its local state information (e.g., entries 1226). Process 818' proceeds to block 1116. If, at block 1112, node k's alias cannot be determined, process 818' proceeds to block 1116.

At block 1116, if there are more nodes in node j's coordination neighborhood to process, then at block 1118, k is incremented to set the next node in node j's coordination neighborhood, and process 818' returns to block 1106 to process the next node. If, at block 1116, there are no more nodes in node j's coordination neighborhood to process, then at block 1120, process 808' completes.

The backbone configuration and operation processes illustrated in FIGS. 4-11 are not strictly sequential and may be performed concurrently (e.g., in parallel) by multiple nodes. For example, one part of backbone 110 may have already established aliases and be scheduling channel access while another part is still initializing, for example, based upon when portions of the backbone were activated.

Referring to FIG. 12, each backbone node (e.g., each station 102 of backbone 110) may create table 1200 of state information about its two-hop neighborhood and the network as a whole. For example, each node has a unique node ID 1202. The node ID may be assigned by an operator of the node and/or network, or may be based on hardware of the node, for example a hardware serial number or MAC address. Each node of backbone 110 identifies the originator node of the backbone (e.g., node ω) during initialization of the backbone. For example, each node may store the node ID of the originator node as originator ID 1204. If a given node is the originator node, its own node ID value 1202 is also stored as originator ID 1204. Other nodes may not determine the originator ID until backbone initialization is performed, as described in regard to FIGS. 4-11. A timestamp indicating an origination time of backbone 110 is stored as origination time 1206.

Countdown threshold 1208 may be employed to ensure that each node has an opportunity to receive coordination messages from one or more neighbor nodes before the given node adopts an alias. The value of countdown threshold may be a time value or a number of messages, and may be set as a predetermined value by a manufacturer of nodes operating in MANET 100. During initialization of backbone 110, each backbone node i (e.g., each station 102 of backbone 110) determines one or more nodes against which they must contend for channel access (a "contention neighborhood" or "contention set" of node i), which is stored as contention neighborhood 1210.

Each node determines state information 1220 about the state of the network in its local vicinity (e.g., each node with which node i interacts), which may be organized into records for each node, including node i itself, organized by node ID 1222. For example, for each node in node i's contention neighborhood, as well as for node i itself, a distance, D, is estimated to the originator node, ω, and stored in distance entry 1224. For each node in node i's contention neighborhood, as well as for node i itself, an alias, A, is determined and stored in alias entry 1226. For each node in node i's coordination neighborhood, a message counter, M, is stored in M counter entry 1228. M counter 1228 may be initialized to 0, indicating the countdown to adopting an alias has not yet begun. For each node in node i's contention neighborhood, as well as for node i itself, a list of nodes in each node's coordination neighborhood is maintained as coordination neighborhood entry 1230. As described herein, a coordination neighborhood may be node i's one-hop neighborhood, although other numbers of hops may be employed.

FIG. 13 shows coordination message 1300 that each backbone node (e.g., station 102 of backbone 110) may provide to its neighbor nodes. For example, as shown, each node i may send its node ID, 1302, to its neighbor nodes, along with node i's estimate of the originator node's ID, 1304, if node i has determined one. Similarly, node i may send its estimate of the backbone origination time, 1306, if node i has determined one. Node i provides its neighbor nodes a list, 1308, of nodes in its contention neighborhood. Node i also provides its neighbor nodes a list, 1320, of nodes in its coordination neighborhood, and a list of the distance estimates, 1324, and alias estimates, 1320, for each node in its coordination neighborhood organized by node ID 1322.

Figure 14:
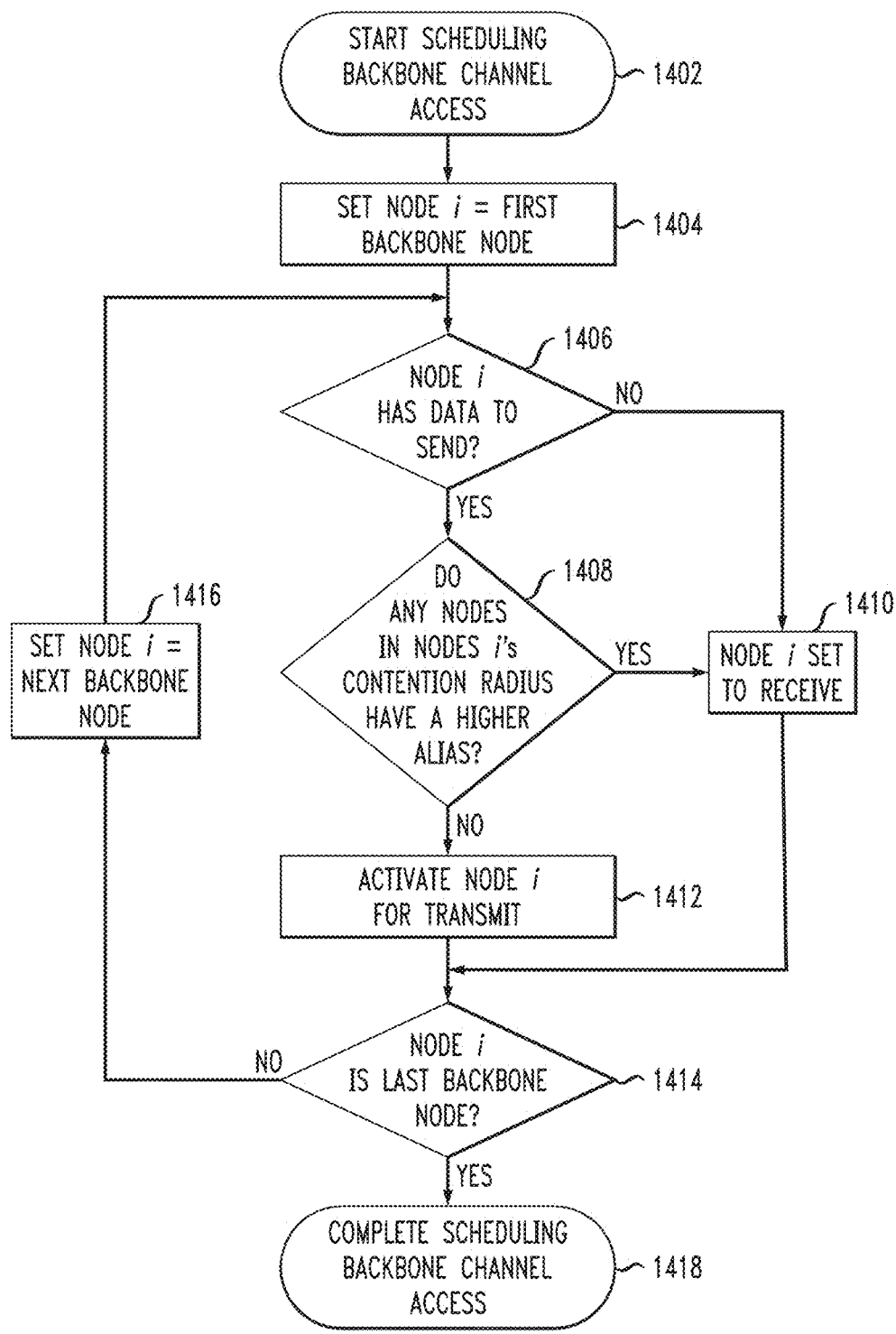
FIG. 14 is a flow diagram showing an illustrative process for scheduling backbone channel access of the MANET operating process of FIG. 4.

FIG. 14 shows a flow diagram of illustrative process 1400 for scheduling access to backbone 110. In some embodiments, access to backbone 110 might be determined based on a plurality of timeslots of a determined duration. In some embodiments, scheduling process 1400 may be performed by each backbone node (e.g., each station 102 of backbone 110) to determine which node is activated for each timeslot of backbone 110. At block 1402, scheduling process 1400 starts, for example at the beginning of a new time slot of backbone 110. At block 1404, process 1400 is performed for an initial node of backbone 110, node i. At block 1406, if node i has data to send on backbone 110, then at block 1408, node i determines whether any nodes in its contention radius (e.g., contention set) have a higher alias. If, at block 1408, node i has the highest alias, then at block 1412, node i is activated to transmit for the given timeslot to send data to backbone 110. At block 1414, if node i is the final backbone node, then at block 1418, scheduling process 1400 completes. At block 1414, if node i is not the final backbone node, then at block 1416, i is incremented and process 1400 returns to block 1406 to repeat for the next backbone node.

If, at block 1408, node i does not have the highest alias, then at block 1410, node i is set to receive, and at block 1414, process 1400 might be performed for a next node of backbone 110, if any.

If, at block 1406, node i has no data to send, it does not need access to backbone 110, and at block 1410, node i is set to receive, and at block 1414, process 1400 might be performed for a next node of backbone 110, if any.

Thus, described embodiments allow a MANET radio node to create a temporary virtual backbone and reap some of the benefits of a fixed back-haul network without having to build the fixed network. Further, some embodiments employ a distributed channel access algorithm suitable for a virtual backbone that improves channel access efficiency in certain kinds of backbone topologies (e.g., bus and ring networks, for example).

Referring to FIG. 15, in some embodiments, one or more nodes (e.g., any of nodes 102, 104, 106 and/or 108 of FIG. 1) may be implemented as one or more computers or coupled to one or more computers. For example, computer 1500 may include processor 1502, volatile memory 1504 (e.g., RAM), non-volatile memory 1506 (e.g., a hard disk drive, a solid state drive such as a flash drive, a hybrid magnetic and solid state drive, etc.), graphical user interface (GUI) 1508 (e.g., a display or touchscreen, etc.) and input/output (I/O) device 1520 (e.g., a mouse, a keyboard, a touchscreen, and so forth). Non-volatile memory 1506 stores computer instructions 1512, an operating system 1516 and data 1518 such that, for example, the computer instructions 1512 are executed by the processor 1502 out of volatile memory 1504 to perform at least a portion of processes 400, 404', 406', 454', 604', 612', 808', 812', 818', and 1400 (e.g., FIGS. 4, 4A, 5, 6, 7, 8, 9, 10, 11, and 14). Program code may be applied to data entered using an input device of GUI 1508 or received from I/O device 1520.

The processes described herein are not limited to use with the hardware and software of FIG. 15 and may find applicability in any computing or processing environment and with any type of machine or set of machines that is capable of running a computer program. The processes described herein may be implemented in hardware, software, or a combination of the two.

The processes described herein are not limited to the specific embodiments described. For example, processes 400, 404', 406', 454', 604', 612', 808', 812', 818', and 1400 are not limited to the specific processing order shown in FIGS. 4, 4A, 5, 6, 7, 8, 9, 10, 11, and 14. Rather, any of the blocks may be re-ordered, combined or removed, or performed in parallel or in serial, as necessary, to achieve the results set forth herein.

Processor 1502 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

I claim:

1. A method of operating a mobile ad-hoc network (MANET) comprising a plurality of nodes, the method comprising:
    identifying one or more stationary nodes and one or more mobile nodes from the plurality of nodes, wherein the one or more stationary nodes is configured to be stationary for a set temporary period of time;
    setting one or more of the identified stationary nodes as backbone nodes;
    forming a backbone network comprising one or more backbone nodes;
    determining an alias for each backbone node based upon signals identifying a respective proximity of at least one of the plurality of nodes of the MANET relative to a respective backbone node received from at least a same or different one of the plurality of nodes of the MANET;
    allocating channel access to each backbone node based upon the determined alias for the one or more backbone nodes, wherein the backbone node activates unless a channel access priority of an alias used by one of the backbone node's two-hop neighbors exceeds a channel access priority of the backbone node's own alias; and
    dynamically reconfiguring, during operation of the MANET, the backbone network to add or remove one or more of the stationary nodes and scheduling access to the reconfigured backbone network without interruption of MANET communications.

2. The method of claim 1, wherein forming a backbone comprising the one or more stationary nodes comprises:
    identifying one of the backbone nodes as a backbone originator node; and
    determining, for the one or more backbone nodes a distance to the backbone originator node.

3. The method of claim 2, further comprising:
    identifying, by the one or more backbone nodes, one or more backbone nodes within a predetermined coordination radius; and
    sending, by the one or more backbone nodes, the determined distance to each backbone node within the predetermined coordination radius.

4. The method of claim 3, wherein the predetermined coordination radius is one hop.

5. The method of claim 2, wherein determining an alias for the one or more backbone nodes comprises:
    assigning an associated alias to the backbone originator node;
    assigning an associated alias to the one or more backbone nodes based upon a corresponding priority level of a given node, the priority level based, at least in part, upon the determined distance.

6. The method of claim 5, further comprising:
    determining the priority level for the given node based upon the determined distance and a unique identifier associated with the given node.

7. The method of claim 5, wherein allocating channel access to each backbone node further comprises:
    determining a contention radius associated with the backbone node;
    determining an associated alias for each backbone node within the determined contention radius; and
    activating a backbone node having an alias associated with a highest priority level.

8. The method of claim 7, wherein the contention radius is two hops.

9. The method of claim 1, wherein each backbone node comprises a MANET node and a backbone access node, the method further comprising:
    operating the MANET node to communicate with associated ones of the one or more mobile nodes;
    operating the backbone access node to communicate with associated other ones of the one or more backbone nodes; and
    communicating data between the one or more mobile nodes and the backbone network by communicating data between the MANET node and the backbone access node.

10. The method of claim 9, further comprising:
    operating the MANET node at a first frequency allocation and operating the backbone access node at a second, different frequency allocation.

11. The method of claim 9, wherein the backbone access node comprises a directional antenna, the method further comprising:
    employing the directional antenna to direct a radio signal between a backbone access node of a first one of the one or more backbone nodes and a backbone access node of a second of the one or more backbone nodes.

12. The method of claim 9, wherein communicating data between the MANET node and the backbone access node further comprises:
    operating the backbone access node in accordance with a first protocol and operating the MANET node in accordance with a second, different protocol; and converting signals between the first protocol and the second protocol.

13. The method of claim 9, wherein the backbone access node comprises an optical transceiver, the method further comprising:
   employing the optical transceiver to transmit and receive optical signals between a backbone access node of a first one of the one or more backbone nodes and a backbone access node of a second of the one or more backbone nodes.

14. An apparatus for use in a mobile ad-hoc network (MANET), the apparatus comprising:
   a transceiver for transmitting and receiving signals between the apparatus and a plurality of nodes of the MANET; and
   a processor to:
      set an identifier to identify the apparatus as either a backbone node or a mobile node, wherein the one or more stationary nodes is configured to be stationary for a set temporary period of time;
      determine an alias based upon a signal identifying a proximity of at least one of the plurality of nodes of the MANET relative to the apparatus received from at least a same or different one of the plurality of nodes of the MANET for at least one of: the apparatus, and one or more nodes in communication with the apparatus;
      if the apparatus is identified as a backbone node:
         form at least a portion of a backbone link with one or more other backbone nodes; and
         allocate channel access to the backbone node based upon the determined alias for the backbone node, wherein the backbone node activates unless a channel access priority of an alias used by one of the backbone node's two-hop neighbors exceeds a channel access priority of the backbone node's own alias; and
      dynamically reconfigure, during operation of the MANET, the backbone network to add or remove one or more of the stationary nodes and schedule access to the reconfigured backbone network without interruption of MANET communications.

15. The apparatus of claim 14, wherein the processor is further configured to:
   identify one of the backbone nodes as a backbone originator node;
   determine a distance to the backbone originator node;
   send the determined distance to one or more backbone nodes within a predetermined coordination radius; and
   determine an associated alias of the apparatus based upon a corresponding priority level of the apparatus, the priority level based upon at least one of: the determined distance and a unique identifier associated with the apparatus.

16. The apparatus of claim 15, wherein the predetermined coordination radius is one hop.

17. The apparatus of claim 15, wherein, if the apparatus is identified as a backbone node, the processor is further configured to:
   determine a contention radius associated with the backbone node;
   determine an associated alias for each backbone node within the determined contention radius; and
   activate a backbone node having an alias associated with a highest priority level.

18. The apparatus of claim 17, wherein the contention radius is two hops.

19. The apparatus of claim 14, wherein, if the apparatus is identified as a backbone node, the apparatus comprises:
   a MANET node having a first transceiver to communicate with one or more associated mobile nodes; and
   a backbone access node having a second transceiver to communicate with associated other ones of the one or more backbone nodes.

20. The apparatus of claim 19, wherein the first transceiver is a radio transceiver operable at a first frequency allocation and the second transceiver is a radio transceiver operable at a second, different frequency allocation.

21. The apparatus of claim 20, further comprising:
   a directional antenna to direct a radio signal between the backbone access node and at least one backbone node.

22. The apparatus of claim 19, wherein the first transceiver is a radio transceiver operable in accordance with a first protocol and the second transceiver is a radio transceiver operable in accordance with a second, different protocol, and wherein the processor is configured to convert signals between the first protocol and the second protocol.

23. The apparatus of claim 19, wherein the backbone access node comprises an optical transceiver to transmit and receive optical signals between the backbone access node and at least one backbone node.

24. A system comprising:
   a plurality of nodes arranged in a mobile ad-hoc network (MANET), each node comprising:
      a transceiver for transmitting and receiving signals between the node and at least one other node of the plurality of nodes of the MANET; and
      a processor to:
         set an identifier to identify the node as either a backbone node or a mobile node, wherein the one or more stationary nodes is configured to be stationary for a set temporary period of time;
         determine an alias based upon a signal identifying a proximity of at least one other of the plurality of nodes of the MANET relative to the node received from the least one other of the plurality of nodes of the MANET for at least one of: the node, and one or more nodes in communication with the node;
         if the node is identified as a backbone node:
            form at least a portion of a backbone link with one or more other backbone nodes; and
            allocate channel access to the backbone node based upon the determined alias for the backbone node, wherein the backbone node activates unless a channel access priority of an alias used by one of the backbone node's two-hop neighbors exceeds a channel access priority of the backbone node's own alias; and
         dynamically reconfigure, during operation of the MANET, the backbone network to add or remove one or more of the stationary nodes and schedule access to the reconfigured backbone network without interruption of MANET communications.

25. The system of claim 24, wherein the processor of each node is further configured to:
   identify one of the backbone nodes as a backbone originator node;
   determine a distance to the backbone originator node;
   send the determined distance to one or more backbone nodes within a predetermined coordination radius;
   determine an associated alias of the node based upon a corresponding priority level of the node, the priority level based upon at least one of: the determined distance and a unique identifier associated with the node; and if the node is identified as a backbone node:
   determine a contention radius associated with the backbone node;
   determine an associated alias for each backbone node within the determined contention radius; and
   activate a backbone node having an alias associated with a highest priority level.

* * * * *